United States Patent [19]

Ferrando et al.

[11] Patent Number: 5,253,797
[45] Date of Patent: Oct. 19, 1993

[54] METHOD OF BONDING MOLYBDENUM TO STEEL

[75] Inventors: William A. Ferrando, Arlington; Subhash D. Karmarkar, Great Falls, both of Va.; Scott M. Hoover, Burtonsville, Md.; Amarnath P. Divecha, Falls Church, Va.

[73] Assignee: The United States of America as represented by the Secretary of the Navy, Washington, D.C.

[21] Appl. No.: 916,428

[22] Filed: Jul. 21, 1992

[51] Int. Cl.⁵ .................................. B23K 31/02
[52] U.S. Cl. .................... 228/194; 228/209; 228/262.8
[58] Field of Search ........... 228/190, 193, 194, 198, 228/208, 209, 220, 263.15, 263.16; 29/1.1

[56] References Cited

U.S. PATENT DOCUMENTS 4,978,054 12/1990 Ferrando et al. .............. 228/194
5,100,049 3/1992 Divecha et al. ............... 228/198

FOREIGN PATENT DOCUMENTS

| 625432 | 5/1963 | Belgium | 228/209 |
| 284118 | 11/1990 | Fed. Rep. of Germany | 228/194 |
| 188561 | 11/1983 | Japan | 228/194 |
| 491454 | 11/1975 | U.S.S.R. | 228/263.16 |
| 2061155 | 5/1981 | United Kingdom | 228/194 |

OTHER PUBLICATIONS

Metals Handbook, Ninth Edition, vol. 6, pp. 1057, 1058, copyright 1983.

*Primary Examiner*—Samuel M. Heinrich
*Attorney, Agent, or Firm*—John D. Lewis; Roger D. Johnson

[57] ABSTRACT

A thin layer of silver metal is formed between a molybdenum surface and a steel surface. The silver metal layer is diffusion bonded to the molybdenum surface and diffusion bonded to the steel surface, thus bonding the molybdenum and steel surfaces together.

11 Claims, 1 Drawing Sheet

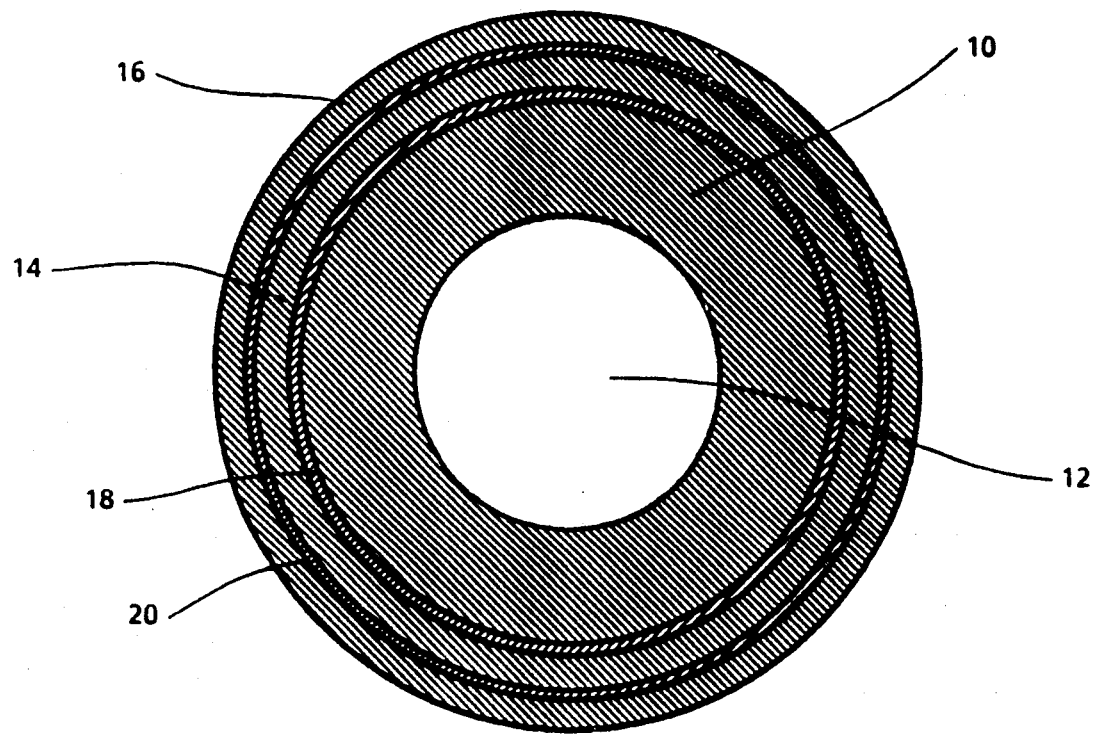

METHOD OF BONDING MOLYBDENUM TO STEEL

BACKGROUND OF THE INVENTION

This invention relates to metallurgy and more particular to methods of bonding different metals or alloys together.

Special devices require the characteristics of high strength, toughness and high temperature stiffness, while limiting additional weight and fabrication cost. Certain gun barrels which eject rounds continuously at high rates have this requirement. A fine degree of alignment must be maintained, despite significantly elevated barrel temperatures.

Previous work has shown that such a barrel can be reinforced by laying up a layer of long tungsten rods around an appropriately machine barrel circumference, sleeving with a steel tube and explosively bonding to form an integral structure. Unfortunately, the tailoring and lay-up procedure for the tungsten rods together with explosive bonding result in a relatively costly fabrication. Fabrication of the compound reinforced steel tube would become much less complex and costly if a simpler reinforcement were used and if the explosive bonding step could be avoided.

It would be desirable to provide means for achieving greater high temperature strength, and stiffness to other steel structures. For example, it would be desirable to reinforce journal bearings or ball bearings so that they would not go out of round during prolonged use under high temperature conditions.

SUMMARY OF THE INVENTIONS

Accordingly an object of this invention is to provide new reinforced steel structures having high strength, toughness, and high temperature stiffness.

Another object of this invention is to provide steel structures that are reinforced with molybdenum members.

A further object of this invention is to provide molybdenum reinforce steel gun barrels.

Yet another object of this invention is to provide a method of bonding molybdenum to steel.

A still further object of this invention is to provide a new, easier method of manufacturing reinforced gun barrels.

These and other objects of this invention are accomplished by providing:

A method of bonding a molybdenum surface to a steel surface by coating either the molybdenum surface or the steel surface or both the molybdenum and steel surfaces with a thin layer of silver metal and then placing the molybdenum and steel surfaces together with the silver layer in between and heating to diffusion bond the silver layer to the molybdenum surface and diffusion bond the silver layer to the steel surface, wherein the heating steps are performed in an inert atmosphere (e.g., argon, helium, nitrogen, etc.) to protect the heated exposed molybdenum surfaces.

This technique of bonding molybdenum surfaces to steel surfaces enables the manufacturing of a new composite reinforced gun barrel comprising a steel gun barrel, a molybdenum cylindrical tube surrounding the steel gun barrel, and a thin steel outer jacket which encloses or covers the molybdenum tube. A first thin silver metal layer is sintered to form a diffusion bond to the outer surface of the molybdenum tube and sintered to form a diffusion bond to the inside surface of the outer steel jacket. A second thin silver metal layer is sintered to form a diffusion bond to the outer surface of the molybdenum tube and is sintered to form a diffusion bond to the inner surface of the steel outer jacket.

BRIEF DESCRIPTION OF THE DRAWING

A more complete appreciation of this invention and many of the attendant advantages thereof will be readily appreciated as the same becomes better understood by reference to the following detailed description when considered in connection with the accompanying drawing which is a cross-sectional schematic view of a reinforced gun barrel according to this invention.

DETAILED DESCRIPTION OF THE PREFERRED EMBODIMENT

The present invention provides a means of reinforcing a steel structure to increase the strength and high temperature stiffness of the structure. This is done by reinforcing the steel structure with a molybdenum member. Molybdenum is chosen for this purpose because of its favorable combination of weight, cost, and elevated temperature stiffness. At 760° C. (1400° F.), for example, molybdenum still shows a tensile strength of about 200 MPa (28.5 to 30 ksi) as compared with a tensile strength of less than 70 MPa (10 ksi) for AISI No. 4140 alloy steel. Moreover, molybdenum retains a tensile strength of about 200 MPa at a temperature of 1000° C.

A significant obstacle to using molybdenum to reinforce steel is that molybdenum does not form a good sinter or diffusion bond with steel. We have discovered that this can be overcomed by forming a thin layer of silver metal between the molybdenum and steel surfaces. When heat is applied for sintering, the silver metal layer forms a diffusion bond with the molybdenum surface and likewise a diffusion bond with the steel surface.

Another problem with using molybdenum is that it rapidly oxidizes in air at temperatures above about 100° C. At the 700° C. and 1000° C. temperatures mentioned above unprotected molybdenum rapidly oxidizes and disintegrates in air. Thus, in any molybdenum reinforce steel structure the major molybdenum surfaces must be covered with steel or some other protective material. For example, if a composite structure of alternating sheets of steel and molybdenum is formed, both outer sheets are steel. When a steel barrel for an automatic weapon is reinforced by placing a molybdenum tube around it. The outer surface of the molydenum tube is protected by placing a thin steel jacket around it. As a practical matter, the small surfaces of the edges of the molybdenum sheets or tubes are not protected. This is the case with the gun barrels. However, there may be cases where the added cost of protecting the edges with claddings or coatings is preferred. For example, where the structure will be subjected to severe oxidizing conditions at high temperatures for substantial periods of time.

Large exposed surfaces of molybdenum must also be protected during process steps which involve heating. The silver metal coatings as well as well as the steel layers will protect a molybdenum surface against oxidation. However, both sides of a molybdenum plate or both the inner and outer surfaces of a molybdenum tube must be covered. Otherwise, the process steps involving higher temperatures (above 100° C.) must be performed in an inert atmosphere such as dry argon, helium, nitrogen, etc. Moreover, even when only the edges of the molybdenum sheet or tube are exposed, it may be preferable to run the sintering or diffusion bonding steps in an inert atmosphere.

The first step in bonding a molybdenum surface to a steel surface is to coat either the molybdenum surface or the steel surface, or both with a thin layer of silver metal. This can be done by any conventional method such as electrolytic deposition, nonelectrolytic deposition, vapor deposition, etc. However, the preferred method of forming the silver metal coating uses molten silver nitrate.

In the first step of the preferred method of coating with silver metal, the molybdenum or steel surface to be bonded is coated with molten $AgNO_3$ at a temperature above the melting point of $AgNO_3$ (mp 212° C.) but below the decomposition temperature of $AgNO_3$ (444° C.). Preferably, the molybdenum or steel surface is preheated to a temperature in this range to prevent the $AgNO_3$ from either freezing or decomposing during the coating process. The molten $AgNO_3$ can be applied by any number of conventional procedures such as dipping, immersion, rolling on, painting, spraying, etc. The molten $AgNO_3$ readily wets the molybdenum or steel surface and rapidly spreads out to form a uniform layer. When molybdenum is preheated, the heating and molten $AgNO_3$ coating of the molybdenum takes place in an inert atmosphere. Alternately, the molybdenum surface (or object) is immersed in a heated bath of molten $AgNO_3$ so that all molybdenum surfaces are rapidly coated with $AgNO_3$. This may be done in air as the $AgNO_3$ coating will protect the molybdenum surface from the oxygen in the air. If $AgNO_3$ freezes out on the molybdenum surface, the surface is held in the bath until the surface is heated up and the solid $AgNO_3$ melts. The steel surface may be coated in the same manner, but the molten $AgNO_3$ coating process need not be rushed as the steel is not attacked by the oxygen in the air.

Next the molten $AgNO_3$ coated molybdenum or steel coated surface (i.e., piece) is preferably heated at a temperature of from above the decomposition temperature of $AgNO_3$ (444° C.) to about 600° C., more preferably from 450° C. to 550° C., and still more preferably from 450° C. to 500° C. until the $AgNO_3$ decomposes to form a thin uniform layer of silver metal on the molybdenum or steel surface. If any molybdenum surface is exposed, the $AgNO_3$ decomposition step is run in an inert atmosphere (dry argon, helium, neon, nitrogen, etc.). In this regard, both the molten $AgNO_3$ coating and silver metal produced by the decomposition of $AgNO_3$ will protect the molybdenum surface from air. Thus if all molybdenum surfaces are coated, the decomposition step may be run in air. Nevertheless, an inert atmosphere is still preferred. In contrast, steel surfaces are not affected by air at these temperatures. While a shiny silver metal coating is produced on steel surfaces, a dull gray coating is formed on the molybdenum surface (see Example 1). However, this gray coating can be easily scraped, brushed, or rubbed away, revealing a shiny, uniform silver metal coating underneath.

Finally, the molybdenum surface and the steel surface that are to be bonded together are placed in contact with the silver metal layer (coating) between them. While the surfaces are held together with the silver layer in between them, they are heated at a temperature of preferably from about 800° C. to about 925° C. and more preferably from 825° C. to 925° C. until a good diffusion bond is formed between the silver metal layer and the molybdenum surface and between the silver metal layer and the steel surface. This diffusion bonding step is preferably performed in an inert atmosphere and, in fact, must be performed in an inert atmosphere if any large molybdenum surface is exposed.

The process as described produces a good molybdenum - steel composite structure. However, some oxide material is present under the silver metal layers formed by the decomposition of molten $AgNO_3$. The bonds produced in the last step will be stronger if this oxide material is reduced or eliminated. Therefore, before the sintering or bonding step it is preferably to heat the silver metal coated molybdenum surface or silver coated steel surface in a reducing atmosphere (hydrogen) at a temperature of preferably from about 800° C. to about 925° C. and more preferably from 875° C. to 900° C. to reduce the oxide.

Note: the dull gray coating should be removed from the silver metal coating on the molybdenum surface before this reduction treatment. This reduction treatment toughness the dull gray coating and makes it difficult to remove (see Example 1).

A special embodiment of this invention is the use of a molybdenum tube to reinforce the steel barrel of an automatic weapon. Referring to the figure, there is shown a steel gun barrel 10 with a hole 12 in it. A thin molybdenum tube 14 is fitted over the steel gun barrel 10. A very thin layer silver metal 18 separates the steel gun barrel 10 from the molybdenum tube 14. The silver metal layer 18 is diffusion bonded to the outer surface of the steel gun barrel 10 and the silver metal layer 18 is also diffusion bonded to the inner surface of the molybdenum tube 14. A thin tubular outer steel jacket 16 is fitted over the outer surface of the molybdenum tube 14. The outer steel jacket 16 protects the outer surface of the molybdenum tube 14 from oxidation in air at the high temperatures ($\sim$1300° F.) reached during the firing of the gun. A very thin layer of silver metal 20 separates the molybdenum tube 14 from the outer steel jacket 16. The silver metal layer 20 is diffusion bonded to the outer layer of the molybdenum tube 14 and the silver metal layer 20 is also diffusion bonded to the inner surface of the outer steel jacket 16.

Example 2 illustrates a method of producing the molybdenum reinforce steel gun barrel according to this invention. The silver metal coating and diffusion bonding techniques discussed above are employed. Additionally, the molybdenum tube 14 fits over the steel barrel 10 and the out steel jacket 16 fits over the molybdenum tube 14 with such close tolerances that a heat shrink procedure is required. In the heat shrink procedure, the inner tube is cooled to reduce its outer diameter while the outer tube is heated to expand its inner diameter. The heated outer tube is then slipped over the cooled inner tube. Normally, this would not be possible because of the large amount of friction between steel and molybdenum surfaces. However, the silver metal is an excellent lubricant and the friction problem is avoided. Any excess silver metal is simply squeezed out from between the tubes and is easily removed.

The general nature of the invention having been set forth, the following examples are presented as specific illustrations thereof. It will be understood that the invention is not limited to these specific examples, but is susceptible to various modifications that will be recognized by one of ordinary skill in the art.

EXAMPLE 1

A portion of pure think walled molybdenum tube approximately 0.75 inch inner diameter (I.D.) and 3 inches long was cleaned with solvent. It was dipped in molten $AgNO_3$ (~250° C.) to coat all surfaces. Then the tube was heated above the decomposition temperature of $AgNO_3$. Characteristic brown $NO_2$ fumes were given off. Upon removal from the oven, the tube surface was found to have a uniform gray coating which could be removed by scraping. A quick review of the molybdenum compounds revealed that molybdates are formed by many of the alkali and transition metals, for example: $Na_2MoO_4$, and $NiMoO_4$. It appears that a silver molybdate ($AgMoO_4$) compound was probably formed. A portion of the tube was scraped to remove the coating before inserting it into a tube furnace. Flowing $H_2$ atmosphere was introduced and the furnace was heated to 900° C. for about one hour. The tube was then removed from the furnace. The scraped portion was clearly visible. The remainder was observed to be coated with a very adherent layer which was not readily removable. Apparently, the Ag present becomes closely bonded with the surface in combination with the Mo atoms upon reduction of the molybdate.

The thus coated tube was not used as a reinforcement at this time, primarily because of uncertainty of the surface layer composition and tolerances required for fitting of the concentric reinforcement.

EXAMPLE 2

A second approach was explored. This consisted of silver metal coating a steel barrel which was fitted into a molybdenum tube and silver metal coated outer steel tube which was fitted over the outside of the molybdenum tube. The coating was accomplished by dipping the clean steel barrel and the clean steel outer tube in molten $AgNO_2$ (~250° C.) and then heating them at a temperature above the decomposition temperature of $AgNO_3$ until the $AgNO_3$ decomposed and formed a thin uniform coating of silver metal on the surfaces of the barrel and the outer tube. These coating were of shiny silver metal with no signs of other compounds.

Since a tight compression fit was sought, the three component tubes had been machined to very close tolerances, with only several mils between inner and outer diameter of abutting surfaces. The intent was to insure a high pressure for subsequent elevated temperature sintering. The tubes were put together by first heating the outer steel tube to about 500° C. and pressing same over the molybdenum tube. The outer pair then were reheated to 500° C., while the inner steel barrel was cooled to liquid nitrogen temperature. The outer tube pair then was quickly pressed onto the steel barrel.

The resulting structure was sintered and diffusion bonded heating it at a temperature of 800° C. for 5 hours.

Obviously, numerous modifications and variations of the present invention are possible in light of the above teachings. It is therefore to be understood that within the scope of the appended claims the invention maybe practiced otherwise than as specifically described herein.

We claim:

1. A method of bonding a molybdenum surface to a steel surface by
   (1) forming a thin coating of silver metal on the molybdenum surface; or on the steel surface, or on both the molybdenum and steel surfaces by
      (a) coating the molybdenum surface, the steel surface, or both the molybdenum and steel surfaces with molten $AgNO_3$,
      (b) heating the molten $AgNO_3$ coated surface above the decomposition temperature of $AgNO_3$ to decompose the $AgNO_3$ and form a uniform layer of silver metal on the surface, and
      (c) removing any gray material which may be formed on the surface of the silver metal layer;
   (2) placing the molybdenum surface and the steel surface together with the silver metal layer between them; and
   (3) sintering to form a diffusion bond between the silver metal layer and the molybdenum surface and to form a diffusion bond between the silver metal layer and the steel surface.

2. The process of claim 1 wherein step (3) is performed in an inert atmosphere.

3. The process of claim 1 wherein a silver metal coating is formed on the molybdenum surface in step (1) by
   (a) coating the molybdenum surface with molten $AgNO_3$,
   (b) heating the molten $AgNO_3$ coated molybdenum surface above the decomposition temperature of $AgNO_3$ to decompose the $AgNO_3$ and form a uniform layer of silver on the molybdenum surface, and
   (c) removing the gray material which is formed on the surfaces of the silver metal layer.

4. The process of claim 1 wherein step (1) is performed in an inert atmosphere.

5. The process of claim 1 wherein a silver metal coating is formed on the steel surface in step (1) by
   (a) coating the steel surface with molten $AgNO_3$/ and
   (b) heating the molten $AgNO_3$ coated steel surface above the decomposition temperature of $AgNO_3$ to decompose the $AgNO_3$ and form a uniform layer of silver on the steel surface.

6. The process of claim 1 wherein after step (1) but before step (2) the silver metal layer is annealed in a reducing atmosphere to reduce any oxide below the silver metal layer.

7. The process of claim 1 wherein in step (3) the temperature used is from about 800° C. to about 925° C.

8. The process of claim 7 wherein in step (3) the temperature used is from 825° C. to 925° C.

9. The process of claim 1 wherein after step (1) but before step (2) the silver metal coated surface is heated at a temperature of from about 800° C. about 925° C. in a reducing atmosphere to reduce any oxide below the silver metal coating.

10. The process of claim 9 wherein the silver metal coated surface is heated at a temperature of from 875° C. to 900° C. in the reducing atmosphere.

11. The process of claim 9 wherein the reducing atmosphere is hydrogen.

* * * * *